United States Patent
Lim

(10) Patent No.: US 8,640,691 B2
(45) Date of Patent: Feb. 4, 2014

(54) APPARATUS FOR HEATING FLUID USING SOLAR ENERGY

(75) Inventor: Sang-Hoon Lim, Daejeon-si (KR)

(73) Assignee: Korea Institute of Energy Research, Daejeon-si (KR)

( * ) Notice: Subject to any disclaimer, the term of this patent is extended or adjusted under 35 U.S.C. 154(b) by 413 days.

(21) Appl. No.: 12/971,674

(22) Filed: Dec. 17, 2010

(65) Prior Publication Data

US 2012/0042871 A1 Feb. 23, 2012

(30) Foreign Application Priority Data

Aug. 18, 2010 (KR) .................. 10-2010-0079892

(51) Int. Cl.
*F24J 2/04* (2006.01)
(52) U.S. Cl.
USPC .......................................... 126/640; 126/713
(58) Field of Classification Search
USPC ................................................. 126/640, 713
See application file for complete search history.

(56) References Cited

U.S. PATENT DOCUMENTS

| | | | | |
|---|---|---|---|---|
| 1,442,579 A | * | 1/1923 | McArthur | 312/247 |
| 3,965,683 A | * | 6/1976 | Dix | 60/641.15 |
| 4,423,599 A | * | 1/1984 | Veale | 60/641.8 |
| 5,083,893 A | * | 1/1992 | Yang | 414/595 |
| 6,676,233 B1 | * | 1/2004 | Evans et al. | 312/247 |
| 2009/0183853 A1 | * | 7/2009 | Chen | 165/48.2 |

FOREIGN PATENT DOCUMENTS

| | | | | |
|---|---|---|---|---|
| JP | 56-66650 | | 6/1981 | |
| JP | 57-037659 | * | 3/1982 | F24J 3/02 |
| JP | 2002-047821 | * | 2/2002 | E04H 4/06 |
| KR | 1981-0000061 | | 2/1981 | |
| KR | 1991-0000727 | | 2/1991 | |

* cited by examiner

*Primary Examiner* — Kenneth Rinehart
*Assistant Examiner* — Gajanan M Prabhu
(74) *Attorney, Agent, or Firm* — NSIP Law

(57) ABSTRACT

A fuel heating apparatus capable of heating fluid by use of solar energy to provide water for daily life is provided. The fuel heating apparatus includes a water tank, a lifting part and a control part. The water tank is configured to form an accommodation formed therein to store fluid, has an inlet/an outlet which are formed through the water tank to receive and discharge fluid, respectively, and is formed using light passing material or thermal conductive material. The lifting part is vertically installed at facing sides of the window to lift the water tank such that the fluid is heated through sunlight or solar heat introduced through the window. The control part controls operations of the lifting part. The heated fluid provided to the water tank is used for daily life water.

9 Claims, 6 Drawing Sheets

APPARATUS FOR HEATING FLUID USING SOLAR ENERGY

CROSS-REFERENCE TO RELATED APPLICATION

This application claims the benefit under 35 U.S.C. §119 (a) of Korean Patent Application No. 10-2010-0079892, filed on Aug. 18, 2010, the disclosure of which is incorporated by reference in its entirety for all purposes.

BACKGROUND

1. Field

The following description relates to an apparatus for heating fluid using solar energy, and more particularly, to a fluid heating apparatus using solar energy in which fluid is heated using solar energy and used for daily life water.

2. Description of the Related Art

At present, humans are confronted with two urgent issues that have to be resolved as soon as possible. The first issue is the depletion of fossil fuel like oil and coil, and the second issue is our action to fulfill conditions of United Nations Framework Convention on Climate Change (UNFCCC) to prevent global warming accelerated due to the increase in use of fossil fuel.

With such a trend in use of the fossil fuel, existing oil, coal, natural gas and uranium will be exhausted within 40 years, 210 years, 65 years and 50 years, respectively.

In resolving these issues, clean alternative energy called as "energy for the future" or "green energy" is gathering in importance, and virtually every countries are investing on the development and distribution of the alternative energy.

The alternative energy includes sunlight energy, solar thermal energy, wind energy, geothermal energy, hydrogen energy and waste renewable energy. In recent years, sunlight energy and solar thermal energy have garnered a lot of interest.

The Sun, which has a surface temperature of about 6000° C. and core temperature of about $1.5 \times 10^{7\circ}$ C., releases a great amount of energy of $9.2 \times 10^{22}$ kcal, but is distant from the earth by $1.5 \times 10^{8}$ km. Accordingly, the radiant energy of the Sun reaching to the earth is about only 2 cal.

Such a radiant energy from the Sun serves as a root of energy used for our daily life, and also as the driving force of weather change and oceanic current. In addition, the radiant energy from the Sun has been applied to solar power heating systems, solar houses, and solar power generator.

SUMMARY

In one aspect, there is provided a fluid heating apparatus using solar energy, in which water is heated through solar energy, thereby saving the fuel cost and electric charges required is for obtaining hot water needed for a daily life.

In another aspect, there is provided a fluid heating apparatus using solar energy, capable of ensuring easy installation and removal with simpler configuration and thus being reinstalled while changing construction sites. In addition, the fluid heating apparatus provides lower manufacturing cost and enhances the energy efficiency by collecting or reflecting solar energy without having to install an additional device for enhancing the energy efficiency.

In one general aspect, there is provided a fluid heating apparatus using solar energy. The fluid heating apparatus includes a water tank, which is configured to form an accommodation space formed therein to store fluid, has an inlet/an outlet formed through the water tank to receive and discharge fluid, respectively, and is formed using light passing material or thermal conductive material; a lifting part which is vertically installed at facing sides of the window to lift the water tank such that the fluid is heated through sunlight or solar heat introduced through the window; and a control part which controls operations of the lifting part, wherein the heated fluid provided to the water tank is used for daily life water.

The water tank is formed using glass.

The water tank includes a convex lens having a function of collecting light.

The water tank is provided in a rectangular parallelepiped shape and is provided at a bottom surface and an interior side surface thereof with a reflection layer such that the introduced sunlight and solar heat is reflected to an inside of the water tank.

According to the fluid heating apparatus of the present invention, water is heated through solar energy, thereby saving the fuel cost and electric charges required for obtaining hot water needed for a daily life. In addition, the fluid heating apparatus ensures easy installation and removal with simpler configuration and thus being reinstalled while changing construction sites. In addition, the fluid heating apparatus provides lower manufacturing cost and enhances the energy efficiency by collecting or reflecting solar energy without having to install an additional is device for enhancing the energy efficiency.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of is well-known functions and structures are omitted to enhance clarity and conciseness.

Hereinafter, examples will be described with reference to accompanying drawings in detail.

Figure 1:
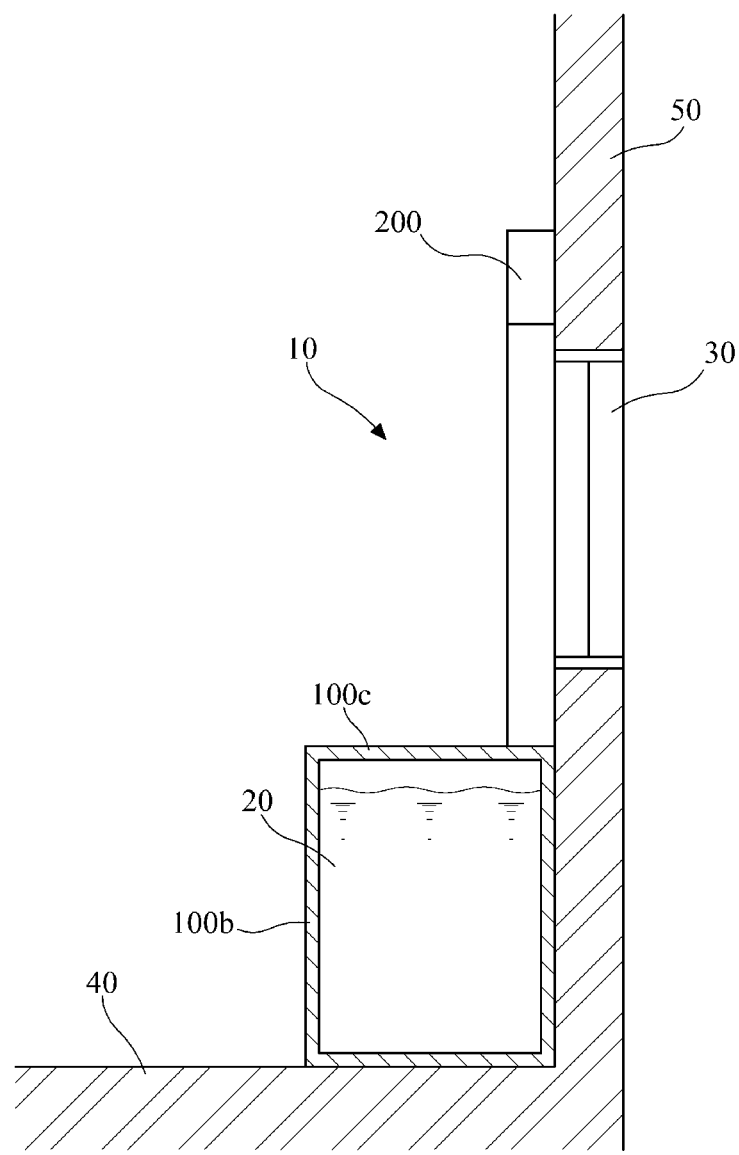
FIG. 1 is a cross sectional view showing an example of a fluid heating apparatus using solar energy.
Figure 2:
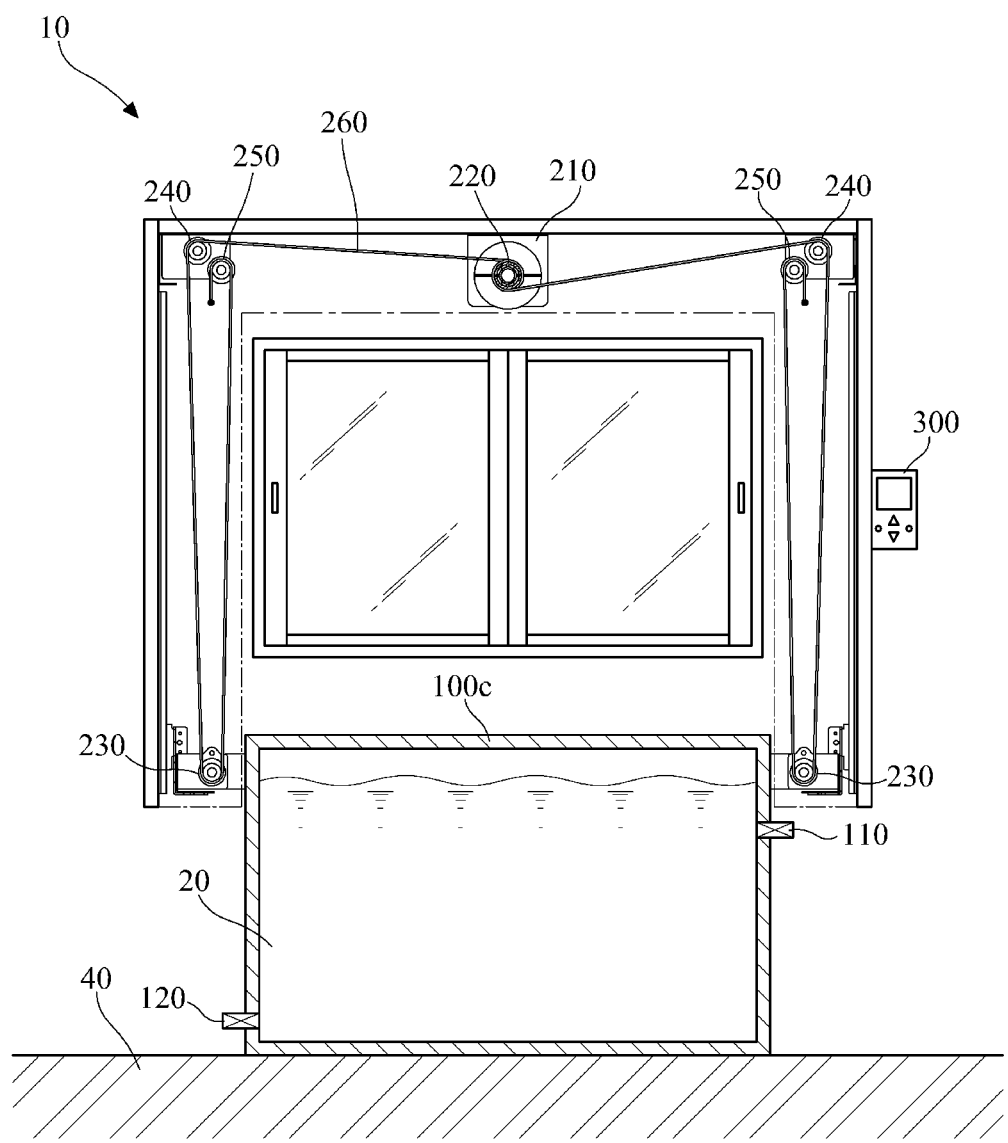
FIG. 2 is a front view showing an example of a fluid heating apparatus using solar energy.
Figure 3:
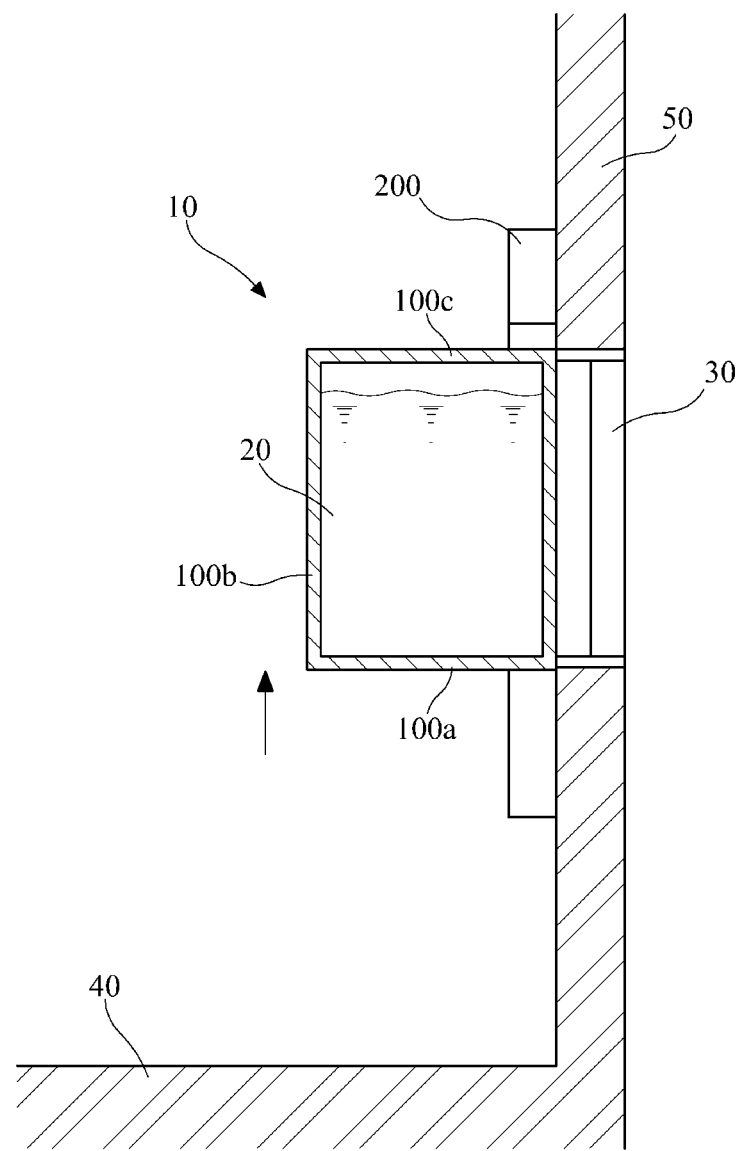
FIG. 3 is a cross sectional view showing a water tank of the fluid heating apparatus moving upward.
Figure 4:
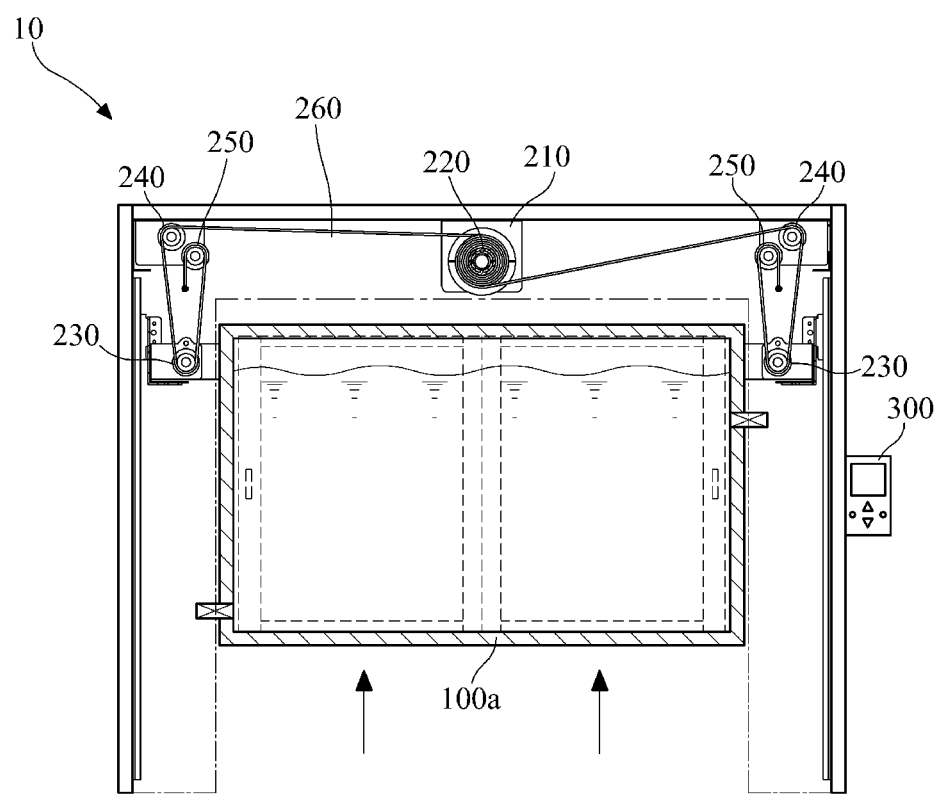
FIG. 4 is a front view showing a water tank of the fluid heating apparatus moving upward.

FIG. 1 is a cross sectional view showing an example of a fluid heating apparatus using solar energy, FIG. 2 is a front view showing an example of a fluid heating apparatus using solar energy, FIG. 3 is a cross sectional view showing a water tank of the fluid heating apparatus moving upward, and FIG. 4 is a front view showing a water tank hannel of the fluid heating apparatus moving upward.

As shown in FIGS. 1 and 2, a fluid heating apparatus 100 according to the present invention includes a water tank 100, a lifting part 200 and a control part 300. The water tank 100 is configured to form an accommodation space formed therein to store fluid 20, has an inlet 120/an outlet 110 formed through the water tank 100 to receive and discharge fluid, respectively, and is formed using light passing material or thermal conductive material. The lifting part 200 is installed lengthwise along two facing sides of a window 30 to lift the water tank 100 such that the fluid 20 is heated through sunlight or solar heat introduced through the window 30. The control part 300 controls operations of the lifting part 200.

As described above, the water tank 100 has the inlet 120 and the outlet 110 which are formed through the water tank 100 to receive and discharge fluid, respectively, and is formed using light passing material or thermal conductive material. The water tank 100 is provided in various forms such as a rectangular parallelepiped shape and a spherical shape. The water tank 100 may be formed using light passing material or thermal conductive material, for example, glass and acryl to receive sunlight and solar heat as much as possible.

The inlet 120 and the outlet 110 of the water tank 100 is formed such that the outlet 110 is formed at a upper part of the water tank 100 to discharge heated fluid and the inlet 120 is formed at a lower part of the water tank 100 to receive the fluid 20 according to the convection is of fluid. Alternatively, the inlet 120 and the outlet 130 may be formed as an integrated part.

The hot water discharged through the outlet 110 may be used as heating water or daily life water such as in washing hair, washing dishes or washing clothes.

In particular, when the water tank 100 is provided in a rectangular parallelepiped shape, a upper surface 100c of the water tank 100 is hinged to lateral surfaces 100b and 100d through a hinge 600 such that the upper surface 100c of the water tank 100 is opened and water is pumped out or the fluid 20 through the upper part of the water tank 100 opened to the outside. In addition, a cover 500 formed using cushioning material, wood, synthetic material or fabric is stacked on or wrapped on the upper surface 100c of the water tank 100 and the water tank 100 having the cover 500 thereon moves downward to be placed supporting against a floor 40 and serves as a chair or a shelf.

The lifting part 200 is installed lengthwise along two facing sides of the window 30 to lift the water tank 100 such that the fluid 20 is heated through sunlight or solar heat introduced through the window 30.

The lifting part 200 may operate on a manual scheme or a driving scheme. In the case of a driving scheme operation, the lifting part 200 may be implemented using various forms of driving members generally known in the art.

According to an example of the present invention, the lifting part 200 may include a power generation part 210 such as a motor, a driving pulley 220 connected to the power generation part 210 and rotating forward and backward, a driven pulley 230 fixed at both upper ends of the water tank 100, a first guide pulley 240 and a second guide pulley 250, which are fixed to a wall surface 50 of the fluid heating apparatus 10 above the driven pulley 230, and a belt 260 which is sequentially wound around the driving pulley 220 and the driven pulley 230 via the first guide pulley 240 interposed between the driving pulley 220 and the driven pulley 230 and then fixed to the wall surface 50 via the second guide pulley 250. As the driving pulley 220 is driven forward/backward and the belt 260 is wound/unwound, the water tank 100 moves upward or downward.

Alternatively, the lifting part 200 may include a pinion gear, which is engaged with an output shaft of a power generation part and is installed at both sides of the window 30, and a rack gear which is engaged with the pinion gear and ascend and descend. As the water tank 100 is connected to the rack gear through a bracket and the rack gear ascends, the water tank 100 is lifted.

In addition, the lifting part 200 may include a cylinder, a piston, a chain, a sprocket, a shaft provided at outer and inner surfaces thereof with a screw thread and a pipe.

In a case where the lifting part 200 operates according to a manual scheme, a user may directly lift the water tank 100 by use of generally known lifting members such as a pulley, a rope and a chain.

Regardless of the operation scheme, a stopper may be additionally formed on the wall surface 50 to fix the water tank 100 in a lifted state.

The control part 300 controls operations of the lifting part 200.

In a case where the lifting part 200 operates on a manual scheme, the control part 300 is implemented by a handle provided at a side of a rope or a chain. In a case where the lifting part 200 operates on a driving scheme, the control part 300 is implemented by a vertical transfer button and an on/off switch electrically connected to the power generation part 210.

According to an example of the present invention, the water tank 100 may be formed using glass.

In addition, according to an example of the present invention, the water tank 100 includes a convex lens having a function of collecting light.

The convex lens serves to condense light beams by its structure in which the thickness of the convex lens increases toward the center, and thus called as condenser lens.

The convex lens may form each surface of the water tank 100 or may be attached to each surface of the water tank 100. Alternatively, the convex lens may be implemented by processing each surface of the water tank 100.

In addition, a Fresnel lens, which is used in an Over Head Projector (OHP) or a tail light of a vehicle, may form each surface of the water tank 100. The Fresnel lens has a refraction angle varying between the center portion and the outer portion and serves to condense light beams similar to a convex lens.

Figure 5:
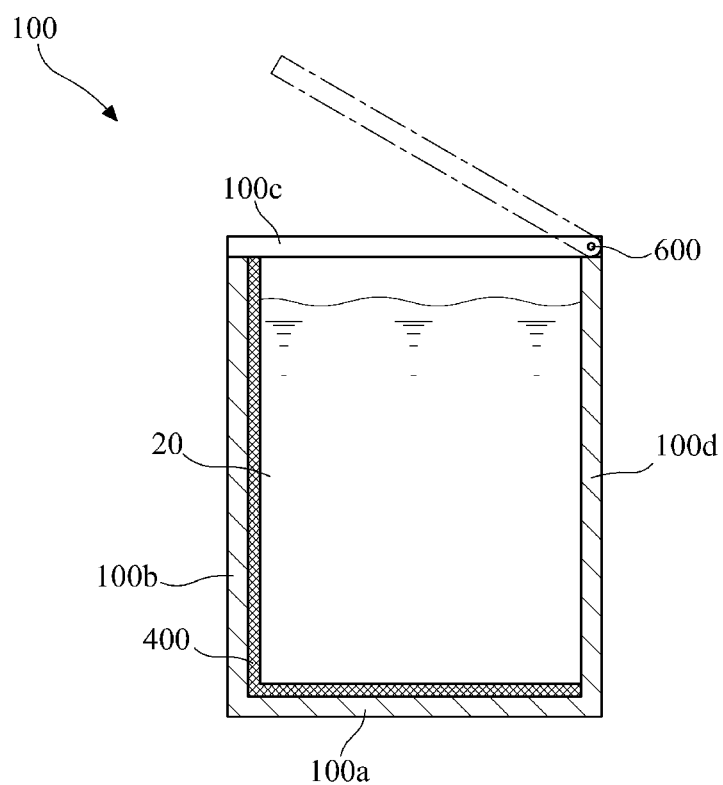
FIG. 5 is a cross sectional view showing another example of a water tank of the fluid heating apparatus.
Figure 6:
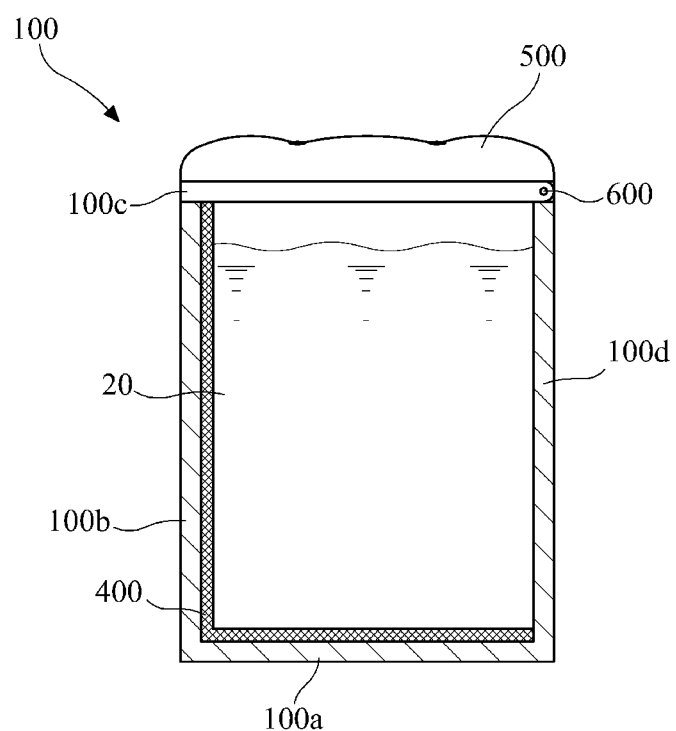
FIG. 6 is a cross sectional view showing still another example of a water tank of the fluid heating apparatus.

FIG. 5 is a cross sectional view showing another example of a water tank of the fluid heating apparatus, and FIG. 6 is a cross sectional view showing still another example of a water tank of the fluid heating apparatus.

The water tank 100 is provided in a rectangular parallelepiped shape and is provided at a bottom surface 100a and the interior side surface 100b of the lateral side surfaces 100b and 100d thereof with a reflection layer 400 such that the introduced sunlight and solar heat is reflected to the inside of the water tank 100.

The reflection layer 400 is implemented by attaching a reflection film or a reflection minor to the bottom surface 100a and the interior side surface 100b of the water tank 100.

The reflection layer 400 reflects sunlight or solar heat, which is introduced through the upper surface 100c and the window side surface 100d of the lateral side surface 100b and 100d, to prevent the sunlight or solar heat from passing through the bottom surface 100a and the interior side surface 100b. As a result, the reflected sunlight and solar heat is provided into the water tank 100 and serves as heat source to heat the fluid 20, thereby enhancing the energy is efficiency.

According to the fluid heating apparatus of the present invention, various type of fluid including water is heated through solar energy, thereby saving the fuel cost and electric charges required for obtaining hot water need for daily life. In addition, the fluid heating apparatus ensures easy installation and removal with simpler configuration and thus being reinstalled while changing construction sites. In addition, the fluid heating apparatus provides lower manufacturing cost and enhances the energy efficiency by collecting or reflecting solar energy without having to install additional device for enhancing the energy efficiency.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fluid heating apparatus that uses solar energy for installation at a building having a window, the fluid heating apparatus comprising:
    a water tank configured to store fluid therein, has an inlet, an outlet or both to receive and to discharge fluid and is formed using a light passing material or a thermal conductive material;
    a lifting part configured to be installed lengthwise along two opposite sides of the window to lift the water tank to face the window such that the fluid is heated through sunlight or solar heat introduced through the window; and
    a control part configured to control operations of the lifting part,
    wherein the heated fluid provided from the water tank is used for daily life water; and
    the water tank has a rectangular parallelepiped shape and is provided at a bottom surface and an interior side surface thereof with a reflection layer such that the introduced sunlight and solar heat is reflected to an inside of the water tank.

2. The fluid heating apparatus of claim 1, wherein the water tank is formed using glass.

3. The fluid heating apparatus of claim 1, wherein the water tank includes a convex lens having a function of collecting light.

4. The fluid heating apparatus of claim 1, wherein the lifting part is configured to position the water tank to substantially cover the window.

5. The fluid heating apparatus of claim 1, wherein the lifting part comprises a pulley connected to the water tank.

6. A fluid heating apparatus for installation on a wall having a window, the fluid heating apparatus comprising:
    a water tank having an inlet and an outlet, a side of the water tank comprising a transparent or thermally conductive panel to be installed to face the window;
    a pair of pulleys configured to be mounted on the wall along two opposite sides of the window to vertically lift and lower the water tank to face the window such that a fluid in the tank is heated through sunlight or solar heat introduced through the window; and
    a control part configured to control operations of the pair of pulleys,
    wherein the water tank comprises an interior bottom surface and an interior side surface facing the window when the water tank is positioned to face the window, the interior bottom surface and the interior side surface comprising a reflection layer configured to reflect sunlight and solar heat to an inside of the water tank.

7. The fluid heating apparatus of claim 6, further comprising a motor for driving the pair of pulleys, the control part being configured to operate the motor.

8. The fluid heating apparatus of claim 1, wherein the lifting part is configured to position the water tank to face a closed window such that the fluid is heated through sunlight or solar heat introduced through the window.

9. The fluid heating apparatus of claim 6, wherein the pair of pulleys is configured to position the water tank to face a closed window such that the fluid is heated through sunlight or solar heat introduced through the window.

* * * * *